(12) United States Patent
Kleckner

(10) Patent No.: US 7,926,527 B2
(45) Date of Patent: Apr. 19, 2011

(54) TIRE WITH TIRE TAG EMBEDDED WITHIN REINFORCING BELT

(75) Inventor: James P. Kleckner, Akron, OH (US)

(73) Assignee: Bridgestone Americas Tire Operations, LLC, Nashville, TN (US)

( * ) Notice: Subject to any disclaimer, the term of this patent is extended or adjusted under 35 U.S.C. 154(b) by 700 days.

(21) Appl. No.: 11/452,676

(22) Filed: Jun. 13, 2006

(65) Prior Publication Data

US 2006/0231180 A1  Oct. 19, 2006

Related U.S. Application Data

(62) Division of application No. 10/743,694, filed on Dec. 22, 2003, now abandoned.

(60) Provisional application No. 60/436,057, filed on Dec. 23, 2002.

(51) Int. Cl.
  *B60C 23/00* (2006.01)
  *B60C 9/18* (2006.01)
(52) U.S. Cl. ..................... 152/152.1; 152/535
(58) Field of Classification Search ............... 152/152.1, 152/535
  See application file for complete search history.

(56) References Cited

U.S. PATENT DOCUMENTS

| | | | | |
|---|---|---|---|---|
| 3,254,693 A | * | 6/1966 | Louis | 152/525 |
| 4,911,217 A | * | 3/1990 | Dunn et al. | 152/152.1 |
| 5,145,542 A | * | 9/1992 | Tanaka et al. | 156/266 |
| 6,147,659 A | * | 11/2000 | Takahashi et al. | 340/572.1 |
| 6,280,556 B1 | * | 8/2001 | Okada et al. | 156/264 |
| 6,581,657 B1 | * | 6/2003 | Brown | 152/152.1 |
| 6,842,151 B2 | * | 1/2005 | Tenten | 340/572.1 |
| 6,991,013 B2 | * | 1/2006 | Poulbot et al. | 152/152.1 |
| 7,050,017 B2 | * | 5/2006 | King et al. | 152/152.1 |
| 7,158,018 B2 | * | 1/2007 | Schick | 152/152.1 |
| 2004/0172180 A1 | * | 9/2004 | Bowman | 701/29 |

FOREIGN PATENT DOCUMENTS

| | | | |
|---|---|---|---|
| EP | 280674 | * | 8/1988 |
| JP | 11-042915 | * | 2/1999 |
| JP | 11-42915 | | 2/1999 |
| JP | 2001-63325 | | 3/2001 |
| WO | 99/29522 | * | 6/1999 |
| WO | 01/12452 | * | 2/2001 |

OTHER PUBLICATIONS

Machine translation for EP 280674 (no date).*
Korea Office Action for 2005-7011802 Dated Oct. 14, 2010.*
Steven D. Maki, Office Action from U.S. Appl. No. 11/751,371, Jul. 29, 2010, 118 pages, United States Patent and Trademark Office, Alexandria, United States.

\* cited by examiner

*Primary Examiner* — Steven D Maki

(57) ABSTRACT

A pneumatic tire includes a tire body having a crown portion and a pair of sidewalls. At least one reinforcing belt is disposed in the crown portion of the tire. A tag is carried by the reinforcing belt. In one embodiment, the tag is disposed in the location of one of the reinforcing cords that is disposed in the reinforcing belt. In another embodiment, the tag is disposed at the splice of the reinforcing belt. An alternative version of the tire has the tag carried in a depression formed in the outer surface of the tire sidewall. The tag may be encapsulated with an encapsulation material that is also disposed in the depression.

10 Claims, 4 Drawing Sheets

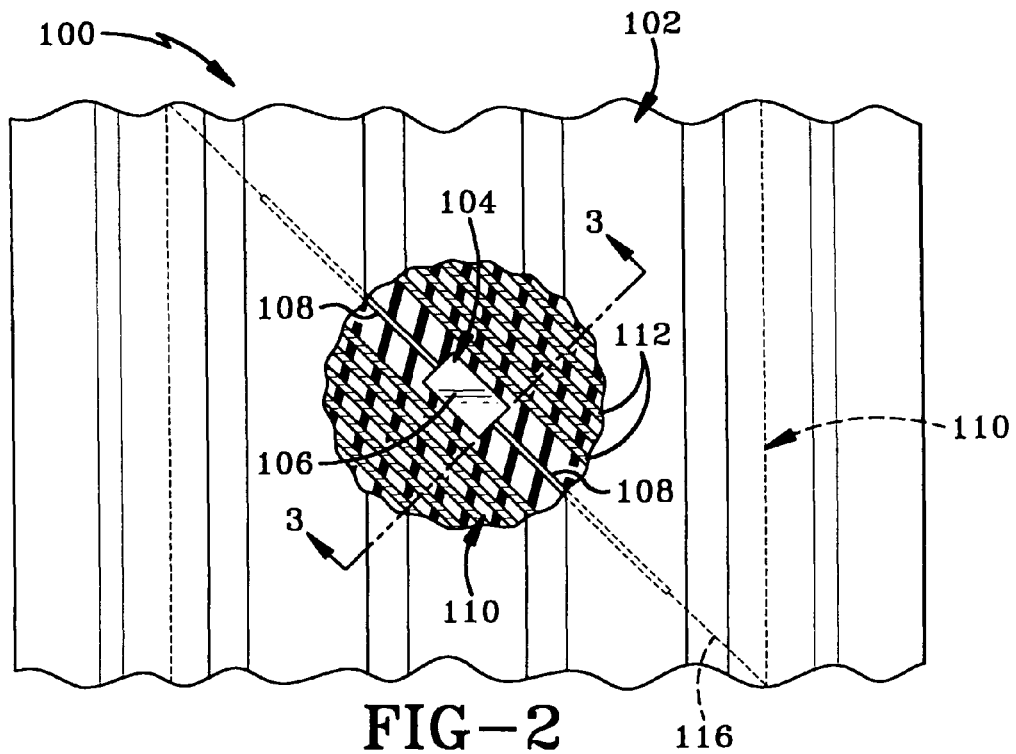
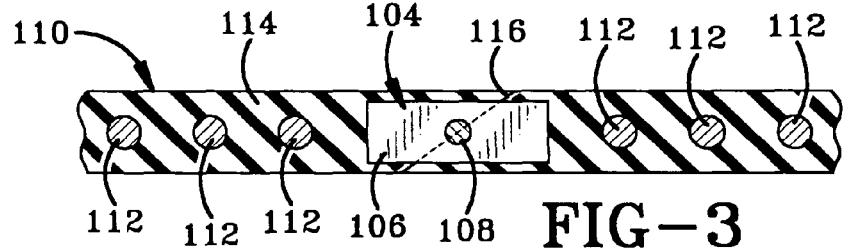
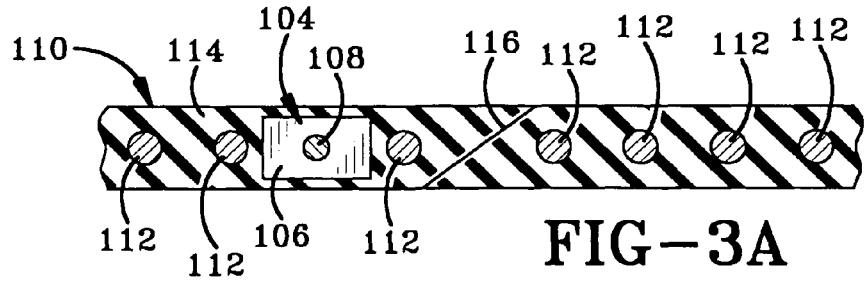
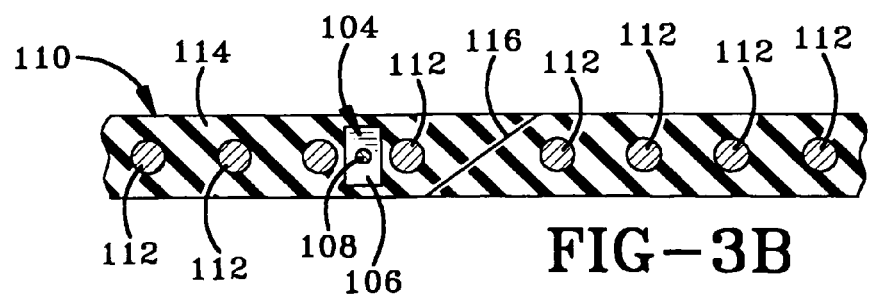

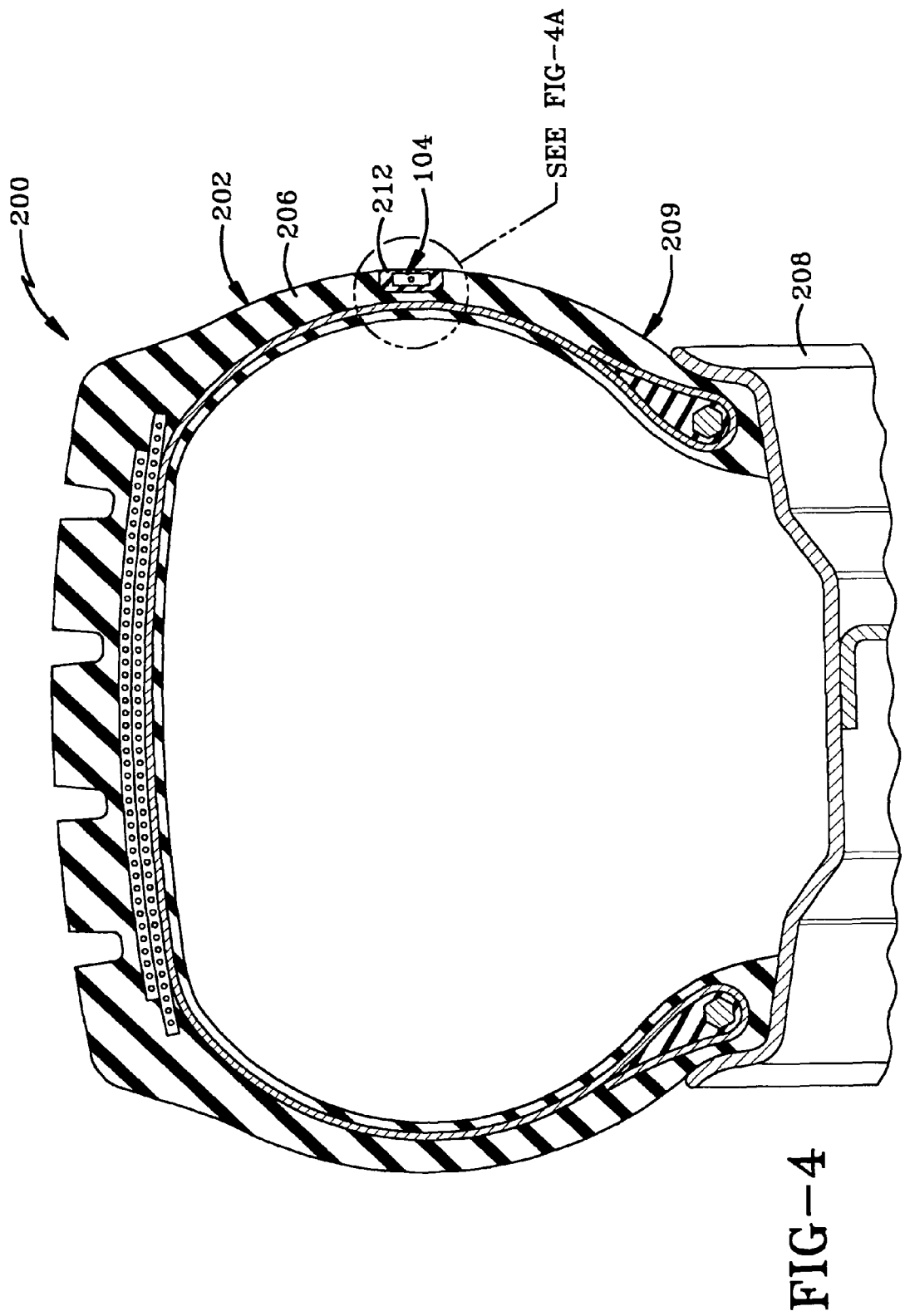

TIRE WITH TIRE TAG EMBEDDED WITHIN REINFORCING BELT

CROSS REFERENCE TO RELATED APPLICATIONS

This application is a divisional application of U.S. application Ser. No. 10/743,694 filed Dec. 22, 2003 now abandoned, which claims priority from U.S. Provisional Patent application Ser. No. 60/436,057 filed Dec. 23, 2002; the disclosures of both are incorporated herein by reference.

BACKGROUND OF THE INVENTION

1. Technical Field

The present invention generally relates to pneumatic tires and, more particularly, to a pneumatic tire in combination with a tire tag. Specifically, the present invention is related to how the tire tag is mounted to the pneumatic tire and the location of the mounting.

2. Background Information

Various types of tire tags in the nature of tire monitoring devices and tire identification devices are known in the art. Tire monitoring devices may be configured to read temperature or pressure and store the information for later retrieval. These devices may also be configured to transmit the information from the tire to an outside reader. Tire monitoring devices may use the information to trigger an alarm when the temperature or pressure of the tire reaches a limit. Tire identification devices allow a tire to be identified through its manufacturing process and after the tire is placed into service. Tire monitoring and identification devices may be passive or active depending on design and desired functions.

One type of tire identification device known in the art is a tire identification chip (tire ID chip). A tire ID chip stores a unique identification number that may be read by an interrogation signal sent by a device that obtains the information from the tire ID chip. Tire manufacturers wish to mount one tire ID chip into each tire manufactured so that the tire may be tracked during the manufacturing process and during use on vehicles.

Given the wide variety of monitoring and identification devices, a wide variety of mounting configurations also exist for these devices. Exemplary known mounting configurations include building the monitoring device into a tire sidewall, building the monitoring device into the bead filler, attaching the device with a patch to the tire sidewall, attaching the device directly to the innerliner with an adhesive, connecting the device to the rim that supports the tire, and mounting the device to the valve stem of the wheel.

BRIEF SUMMARY OF THE INVENTION

The invention provides a first configuration that mounts the tire identification or tire monitoring device in one of the belts of reinforcing cords positioned in the crown of the tire. The identification or monitoring device may take the place of one of the reinforcing cords, may be positioned between reinforcing cords, or may be positioned at the splice that is used to form a loop out of the reinforcing cord ply.

The invention also provides an embodiment wherein the tire identification or tire monitoring device is mounted in a depression formed in the outer surface of the sidewall. The tire identification or tire monitoring device may be encapsulated with an encapsulation material in the depression.

BRIEF DESCRIPTION OF THE SEVERAL VIEWS OF THE DRAWINGS

FIG. 2 is a top plan view, partially in section, of the tire crown showing the tire tag mounted at the splice in the belt.

FIG. 3 is a section view taken along line 3-3 of FIG. 2.

FIG. 3A is a section view similar to FIG. 3 showing an alternate mounting configuration wherein the tire tag replaces one of the reinforcing cords of the belt.

FIG. 3B is a section view similar to FIG. 3 showing an alternative embodiment wherein the tire tag is positioned between adjacent reinforcing cords in the belt.

FIG. 4 is a section view of a pneumatic tire showing the tire tag mounted in a second configuration.

Similar numbers refer to similar parts throughout the specification.

DETAILED DESCRIPTION OF THE INVENTION

Figure 1:
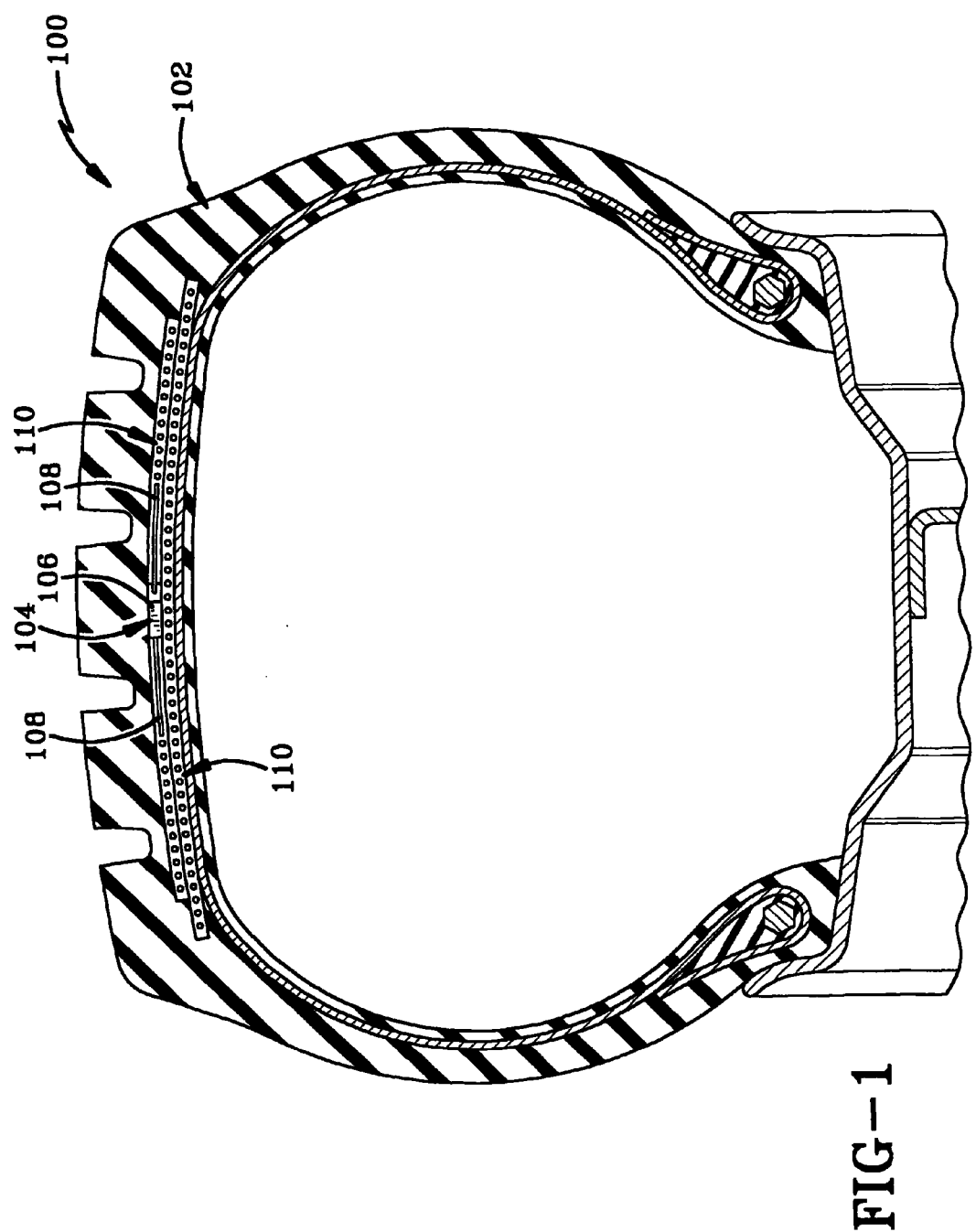
FIG. 1 is a section view of a pneumatic tire showing the first mounting configuration for the tire monitoring or tire identification device.

A first embodiment of a tire and tire tag combination is indicated generally by the numeral 100 in FIGS. 1-3. Combination 100 generally includes a tire 102 and a tag 104 that is mounted to tire 102. Tag 104 may be an identification device or a monitoring device. In the embodiment of tag 104 shown in the drawings, tag 104 has a central body 106 with wires 108 extending from opposed sides of body 106. Body 106 may include any of a variety of elements that are used to store and present information about tire 102 to a reader (not shown) that requests the information.

In the first mounting configuration, tag 104 is built into one of the reinforcing belts 110 disposed in the crown of tire 102. Each reinforcing belt 110 includes a plurality of reinforcing cords 112 disposed adjacent each other. Each reinforcing cord 112 is encased in a rubber material 114 or other suitable materials. Each belt 110 is wrapped circumferentially around tire 102 with the ends of belt 110 being joined at a splice 116. Splice 116 is generally parallel to wires 112. In the first mounting configuration, tag 104 is located at splice 116 in order to create a built-in mounting location for tag 104. Tag 104 may be embedded in the adhesive of splice 116. Tag 104 may be built into the outermost belt 110 in order to improve readability and to decrease its exposure to the curing heat used to attach belt 110 to the body of tire 102. The location also protects tag 104 from tire bending forces during tire shaping.

Tag 104 may be built into splice 116 when splice 116 is formed. In the alternative, tag 104 may be prebuilt into ply 110 at splice 116 or at another suitable location. For instance, in another embodiment of the invention, tag 104 replaces one of reinforcing cords 112 as shown in FIG. 3A. In FIG. 3B, tag 104 is positioned between adjacent reinforcing cords 112. These locations have the benefit of protecting tag 104 from curing heat, protecting tag 104 during tire shaping, and placing tire tag 104 in a location where there is less interference with other tire structures. This location also places tag 104 in a location where it does not protrude from an internal or external surface of tire 102. The location also does not rely on adhesive for durability of the connection between tag 104 and tire 102. Adjacent belts may use suitable mechanisms in opposed locations to tag 104 for tire uniformity.

Figure 4A:
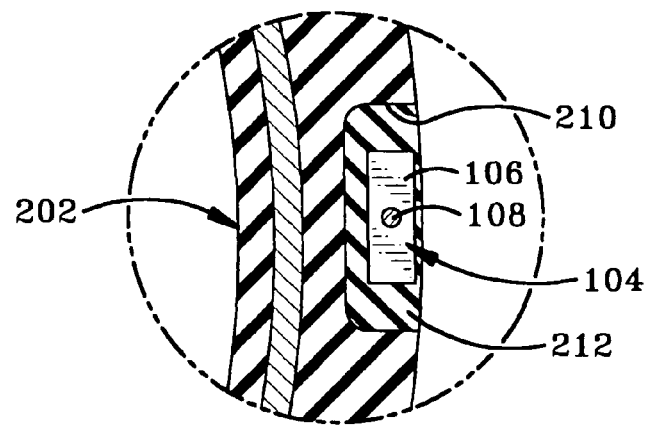
FIG. 4A is an enlarged section view of the encircled portion of FIG. 4.
Figure 5:
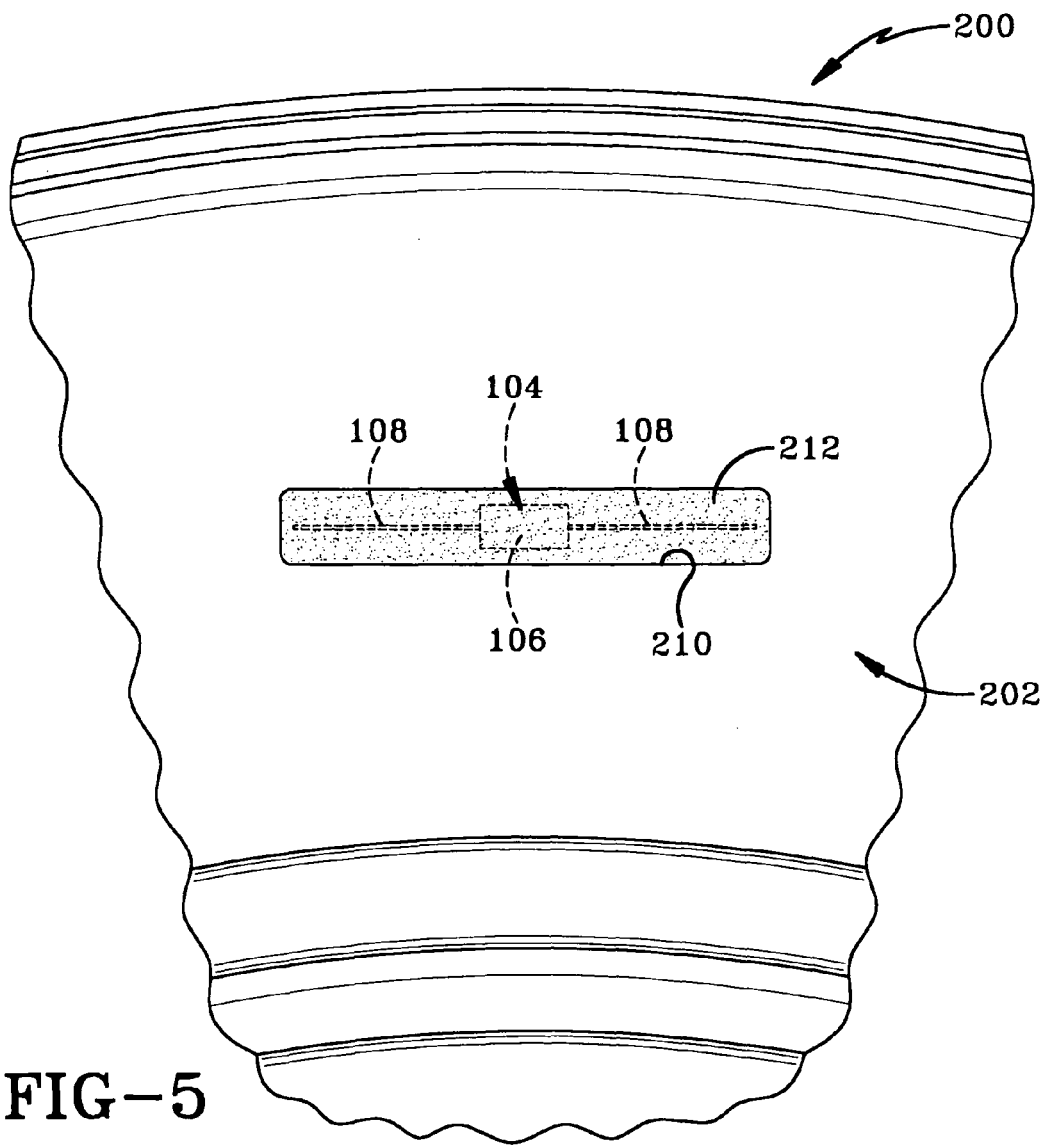
FIG. 5 is an elevation view of the tire showing the mounted tire tag.

The second embodiment of the tire and tag combination is indicated generally by the numeral 200 in FIGS. 4-5. Combination 200 generally includes a pneumatic tire 202 and a tag 204 that is mounted to one of the sidewalls 206 of tire 202. Tag 204 is mounted to sidewall 206 in a location that is adapted to be above the rim 208 when tire 202 is mounted to rim 208. In one embodiment, tag 204 may be mounted immediately above rim 208 where the sidewall is thicker and flexes less. This area is identified by numeral 209 in FIG. 4.

Tag 204 is disposed in a cavity 210 defined by sidewall 206. Cavity 210 has sufficient dimensions to receive the entire body of tag 204 with additional room for an encapsulation material 212. In this specification, encapsulation material 212 may be any of a wide variety of materials that will adhere to tire 202 in order to help secure tag 204 to tire sidewall 206. A variety of known adhesives or repair compounds/materials may be used as encapsulation material 212. Encapsulation material 212 may be a rigid material or a relatively flexible material. One exemplary rigid encapsulation material is an epoxy that prevents the elements of tag 204 from flexing with respect to each other during tire use.

This embodiment allows tag 204 to be installed after tire 202 is fabricated and cured. The embodiment also allows tag 204 to be selectively placed in tire 202. This mounting position does not expose tag 204 to curing heat and prevents tag 204 from extending above the profile of sidewall 206. The embodiment also allows for removal and replacement of tag 204 depending on the type of encapsulation material 212 used.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the invention is an example and the invention is not limited to the exact details shown or described.

The invention claimed is:

1. A tire comprising:
a tire body having a crown portion and a pair of sidewalls;
at least one reinforcing belt disposed in the crown portion of the tire body; the reinforcing belt having a body that defines a radial inner surface and a radial outer surface;
a tag embedded within the reinforcing belt between the radial inner and outer surfaces of the body of the reinforcing belt;
the reinforcing belt including a splice; the tag disposed at the splice; and
the splice including a layer of adhesive; the tag being carried by the adhesive.

2. The tire of claim 1, further comprising at least two reinforcing belts disposed in the crown portion of the tire body;
one of the reinforcing belts being disposed radially outwardly of the other reinforcing belt; and
the tag embedded within the outermost reinforcing belt.

3. The tire of claim 1, wherein the reinforcing belt includes a plurality of spaced reinforcing cords disposed parallel to the splice.

4. The tire of claim 1, wherein the tag is an identification device.

5. The tire of claim 4, wherein the tag includes a body with a wire extending from the body.

6. The tire of claim 1, wherein the tag is a monitoring device.

7. A tire comprising:
a tire body having a crown portion and a pair of sidewalls;
at least two reinforcing belts disposed in the crown portion of the tire body;
each of the reinforcing belts having a body that defines a radial inner surface and a radial outer surface;
one of the belts being disposed radially outwardly of the other belt;
a tag embedded within the body of the outermost reinforcing belt between the radial inner surface and the radial outer surface;
the outermost reinforcing belt including a plurality of spaced reinforcing cords and a splice; the tag disposed at the splice;
the splice being parallel to the reinforcing cords of the reinforcing belt; and
the splice including a layer of adhesive; the tag being carried by the adhesive.

8. The tire of claim 7, wherein the tag is an identification device.

9. The tire of claim 8, wherein the tag includes a body with a wire extending from the body.

10. The tire of claim 7, wherein the tag is a monitoring device.

* * * * *